Patented Dec. 24, 1940

2,226,147

UNITED STATES PATENT OFFICE 2,226,147

PIGMENT SUBSTANCE AND PROCESS FOR PRODUCING THE SAME

Joseph Bartlett Sutton, Bellemoor, Del., assignor to E. I. du Pont de Nemours & Company, Wilmington, Del., a corporation of Delaware No Drawing. Application January 23, 1940, Serial No. 315,162

16 Claims. (Cl. 134—58)

This invention relates to new and useful improvements in the production of pigment materials, and more particularly to the manufacture of improved white or colored pigment substances of superior physical characteristics.

More specifically, the invention has reference to the treatment of a white, relatively insoluble, previously calcined, inorganic pigment and/or extenders therefor with useful types of treating agents, said agents being adapted to impart to said pigment and coating compositions containing the same enhanced gloss and gloss retention characteristics.

It is well known that oleaginous coating compositions containing pigments having relatively high indices of refraction, such as titanium oxide, lithopone, zinc sulfide, etc., or extended forms of the same with calcium sulfate, calcium carbonate, calcium sulfite, and the like, exhibit poor gloss and gloss retention characteristics. That is, when these coating compositions are applied to various objects, such as wood, metal, oil-cloth, linoleum, paper, etc., the resultant films are objectionably dull and matte in appearance. It is also well known that when calcium sulfate or anhydrite, either alone or as extenders for a prime pigment, are present in such coating compositions, the same exhibit the additional undesirable property of relatively high sensitivity towards water. That is, their viscosity becomes increased to an undesirable and objectionable extent when such coatings are prepared or applied under conditions of high atmospheric humidity or if small amounts of water are incorporated therein.

It has been found that these and other objectionable characteristics of prior pigment substances and coating compositions can be easily and effectively overcome and it is accordingly among the objects of this invention to attain such desired results. It is among the particular objects of the invention to afford production of pigment materials, and particularly those containing white inorganic compounds of calcium, which will exhibit improved gloss and gloss retention characteristics when utilized in oleaginous coating compositions; to afford production of white pigments adapted to exhibit improved film color in dried oleaginous coating composition films; and to afford production of calcium sulfate containing pigments of reduced water-sensitivity, whereby the viscosity of oleaginous coating compositions in which such pigments may be present will remain unaffected by the addition of small amounts of water or by atmospheric humidity. A particular object of the invention is to provide a method and agent for treating pigment-useful materials, whereby the same will be adapted to impart improved physical characteristics to enamels, paint or other types of coating compositions and desirably improve the consistency, leveling and working properties of said compositions. Further objects and advantages of the invention will be apparent from the ensuing description.

These and other objects are attainable in this invention which broadly comprises intimately associating with a pigment and/or extender material a relatively small amount of a quaternary ammonium base from the group consisting of tri-alkyl phenyl ammonium hydroxide and tri-alkyl phenyl alkylene ammonium hydroxide, corresponding to the generic formulae, respectively, $$C_6H_5.N(X_3^1).OH \text{ and } C_6H_5X^2.N(X_3^1)OH$$

wherein $X^1$ consists of a monovalent alkyl substituent, $(C_nH_{2n+1},$ such as $CH_3, C_2H_5, C_3H_7,$ etc.) and $X^2$ consists of a divalent alkylene substituent, $(C_nH_{2n},$ such as $CH_2, C_2H_4, C_3H_6,$ etc.)

More restrictedly, the invention comprises incorporating in a pigment-useful substance a small amount of a quaternary ammonium base from the group consisting of tri-alkyl phenyl ammonium hydroxide and tri-alkyl phenyl alkylene ammonium hydroxide, or mixtures thereof, said bases having, respectively, the following probable formulae:

$$C_6H_5.N(X_3^1).OH \text{ and } C_6H_5X^2.N(X_3^1).OH$$

and wherein $X^1$ and $X^2$ are short chain hydrocarbon radicals of less than 8 carbon atoms.

In a more specific and preferred embodiment, the invention comprises intimately associating with a white, previously calcined, inorganic pigment material and/or extender therefor, from about 0.05% to about 2%, based on the weight of such material, of trimethyl benzyl ammonium hydroxide or trimethyl phenyl ammonium hydroxide, and subsequently dry milling the resulting mixture to coat or intimately disperse the treating agent throughout said pigment or extender.

In the practice of the invention, the preferred agent, trimethyl benzyl ammonium hydroxide, will be found most effective for use. Said agent may be conveniently incorporated in the pigment and/or extender during some stage of the manufacture of the pigment or extender substance, being added after calcination, if such treatment is required to develop essential properties. Any desired method for effecting such dispersion or incorporation may be resorted to. Since the treating agent is particularly effective for improving and modifying the characteristics of pigments containing calcium sulfate or anhydrite, such as calcium sulfate or anhydrite-extended titanium oxide or zinc sulfide pigments, the invention will be exemplified by describing such preferred type of treatment.

As indicated, to obtain the beneficial effects of the invention, the pigmenting material need only be treated with a relatively minor quantity of trimethyl benzyl or phenyl ammonium hydroxide, e. g., such amount usually not ranging in excess of substantially 2%, based on the weight of the pigment. Ordinarily, such amount need not exceed a range of, say, from .1% to about 1%, based on the weight of the pigment. An effective and preferred range comprises from about .25 to about .75%, also based upon pigment weight. Thus, for example, one may feed a 40% solution of the trimethyl benzyl or phenyl ammonium hydroxide (corresponding to about 0.5%, based on the weight of the pigment), to a dry, previously calcined pigment material comprising 70% calcium sulfate and 30% titanium oxide. After addition of such solution to the pigment, the resultant mixture is then preferably subjected to dry milling by passing the same through a pulverizing mill, such as a ring roll mill, equipped with an air separator, following which the material is passed through a disintegrator, such as a rotary hammer mill, to effect final disintegration and admixture of the pigment and treating agents. After such disintegration, the treated pigment may then be directly employed in various types of floating formulations.

In order that the invention may be more clearly understood, the following illustrative examples are given, none of which are to be considered as in limitation of the invention:

Example I

An aqueous solution, comprising 40% by weight of trimethyl benzyl ammonium hydroxide was sprayed onto a previously calcined titanium oxide pigment extended with calcium sulphate, the amount of agent so added being about 0.5% of the weight of the pigment. The treated product was then pulverized in a ring-roll mill, and then further disintegrated by treatment in a rotary hammer mill.

Example II

An aqueous solution comprising 40% by weight of trimethyl phenyl ammonium hydroxide was sprayed onto a previously calcined 70%

$$CaSO_4—30\% \ TiO_2$$

pigment as the same was being fed into a 50-inch ring roll mill equipped with air separator. The trimethyl phenyl ammonium hydroxide was added in the amount of 0.5% on the basis of the weight of the pigment, said treated pigment being then pulverized in said ring roll mill at the rate of 2000 lbs./hr., and thereafter disintegrated by passage through a 24-inch rotary hammer mill at a rate of 2000 lbs./hr.

The treated pigment obtained from the foregoing examples was found to be definitely superior to an identical but untreated, calcined 70% $CaSO_4—30\% \ TiO_2$ pigment. Thus, when incorporated in a conventional type of enamel paint formulation, paint films resulted having 20% higher gloss than those exhibited by like films containing the same pigment but in untreated state. These comparative results were determined on the Lange Photo-Electric Gloss Meter by the method described at pages 247–248 of Dr. St. John's translation of Dr. Lange's "Photo-Elements and their Application," published in 1938 by Reinhold Publishing Corporation, the deflection of the needle of said gloss meter being adjusted to read 100 for a standard sample of polished black glass. Again, the gloss of said treated pigment-containing enamel paint film after exposure for a period of 3 months was twice that of the control enamel paint film tested in exactly the same manner and identical in all respects except that an untreated, calcined 70%

$$CaSO_4—30\% \ TiO_2$$

pigment was employed therein. Also, oleaginous paint films containing the novel treated pigment of this invention had superior color. When formulated in a flat paint composition, comprising 0.5% water by volume, said treated pigment provided a paint having a 65% lower viscosity (measured on the Stormer viscometer illustrated at page 575 of the 8th (January 1937) edition of "Physical and Chemical Examination of Paints, Varnishes, Lacquers and Colors," by Henry A. Gardner) than that of a corresponding flat paint made with a similar but untreated prior art pigment. Such improved paint was eminently suited for application to interior walls, whereas the latter type of composition was too viscous for practical use.

Example III 0.137 pound of trimethyl benzyl ammonium hydroxide, after dissolution in 0.1952 pound of water, was sprayed on 25 pounds of a calcined composite titanium oxide-calcium sulfate pigment in which the titanium oxide content consisted of approximately 30% and the anhydrite or calcium sulfate consisted of approximately 70%. After treatment, the composite pigment was dry milled for 25 minutes in an edge runner mill, whereby complete dissemination of the treating agent throughout the pigment became effected. The milled pigment was then disintegrated by passage through a squirrel cage disintegrator. A 25-pound control sample of the same type of calcined composite pigment, but untreated with the trimethyl benzyl ammonium hydroxide, was also dry milled for 25 minutes in the edge runner mill, and thereafter disintegrated in the squirrel cage disintegrator. The treated pigment, when tested comparatively against the untreated pigment, was found to posses definitely superior characteristics over the control sample, not only in respect to water sensitivity, gloss and gloss retention, but also in respect to film color-imparting properties.

Example IV 0.125 lb. of trimethyl phenyl ammonium hydroxide, dissolved in 0.1875 lb. water, was sprayed on 25 lbs. of a calcined titanium-calcium pigment, consisting of 30% titanium dioxide and 70% anhydrite. The treated pigment was then dry milled for 20 minutes in an edge runner mill to effect complete dissemination of the treating agent throughout the pigment. The edge runner milled pigment was subsequently disintegrated by passage through a squirrel cage disintegrator. A 25-lb. control sample of the same calcined titanium-calcium pigment, but untreated with trimethyl phenyl ammonium hydroxide, was also dry milled for 20 minutes in the edge runner mill, without addition of the trimethyl phenyl ammonium hydroxide and then disintegrated by passage through the squirrel cage disintegrator. When comparatively tested, the treated pigment was found to be definitely superior to the untreated control sample, not only in water sensitivity, gloss and gloss retention characteristics, but in film color-imparting properties as well.

Although intimate association of the trimethyl benzyl or phenyl ammonium hydroxide has been effected in specific manners and with the individual particles of particular types of pigment substances, said agents are not limited to such uses, nor to the specific manners of incorporation. As stated, one preferred method of treatment comprises spraying an aqueous solution of the agent, at a strength of about 40%, onto a dry pigment substance. Dry-milling of the treated pigment is then had, preferably in a pulverizing process, such as a pulverizing mill equipped with an air separator, followed by disintegration. Pulverizing is defined in Riegal's "Industrial Chemistry" (p. 664, second ed., 1933) as the reduction of coarse powder to an inpalpable powder, and is accomplished in ring roll mills, edge runner mills, pebble mills, Buhr stone mills, and the like. On the other hand, disintegration is defined therein as the reduction of egg and nut sizes to a coarse powder, and is accomplished in rotary hammer mills, squirrel cage disintegrators, and the like. Due to the superior results which ordinarily obtain, I prefer to effect pulverizing in a ring roll mill equipped with air separator, and subsequent disintegration in a rotary hammer mill. If desired, the pigment may be dry milled, after addition of the agent thereto, through the medium of any well known type of dry milling process; or such agent may be added to a partially dry milled pigment, as for example, to a previously pulverized pigment material, the agent being then intimately mixed with such pulverized pigment by further dry milling, as by passage through a disintegrator. Similarly, although said agent is preferably admixed while in aqueous state with the dry pigment, admixture may be effected, if desired, while both are in dry condition. However, due to the fact that superior results usually obtain when said agent is mixed while in aqueous state with a dry pigment, such latter type of mixing method is preferred, especially in view of the fact that more complete, intimate and uniform admixture of the agent with the pigment results.

As has been indicated, the amount of treating agent required in any given instance is variable and is easily determinable by experimental trial. Obviously, the amount of treating agent to be employed will depend upon the type and previous history of the pigment substance and desired properties to be developed in the finished pigment. Usually, a relatively minor amount of treating agent need be used corresponding to as little as about 0.05% and to as high as about 2%, based on the weight of the pigment, such upper limit usually sufficing for most practical purposes. When amounts in excess of said upper limit are used, it will be found that the beneficial effects of the invention do not increase, whereas if amounts greatly in excess thereof be used, the beneficial results of the invention will be found to diminish somewhat.

As stated, while specific types of pigment substances and particularly those comprising the white, inorganic variety, have been subjected to treatment in the invention hereinabove, it will be understood that the invention has general application to all types of pigment materials, whether white or colored, and whether of organic or inorganic origin. Additionally, treatment of extenders or modifying agents, alone or in combination with such pigments, as well as dyestuff materials adapted for use in coating compositions, is also contemplated. In its preferred adaptation, the invention will be found to present marked beneficial advantages when applied to the treatment of inorganic, white pigments and/or extenders, specific examples of which include titanium oxide, titanates of divalent metals, zirconium oxide, lithopone, zinc sulfide, titanated lithopones, zinc oxide, antimony oxide, white lead, etc., either alone or extended with such white extenders as calcium sulfate, anhydrite, gypsum, barium sulfate, calcium carbonate, calcium sulfite, barium carbonate, silica, aluminum or magnesium silicates, aluminum oxide, magnesium fluoride, sodium fluoride, aluminum fluoride, sodium fluosilicate, sodium aluminum fluoride, magnesium fluosilicate, pachnolite, calcium fluoride, etc. Specific examples of colored pigments which may be subject to treatment in the invention include the following: chrome yellows, consisting essentially of lead chromates with varying quantities of lead sulfate, carbonate and diluents, basic zinc chromate, cadmium yellows, chrome red, chrome orange, chrome greens, such as chromic oxide and allied greens, barium chromate, blue pigments, such as ultramarine blue, Prussian blue, cobalt and allied blues and violets, iron blue, earth colors such as iron oxide and the like, tinted titanium oxide, or carbon black, etc. Accordingly, the terms "pigment" and/or "pigment-useful substances," here and in the appended claims, are intended to embrace the foregoing types of compounds.

In applying the treating agent to the pigment, it will be found preferable, as indicated, to effect addition thereto while the pigment substance is in the dry finished condition. In instances where such pigment materials as titanium oxide, lithopone, zinc sulfide, etc., are subjected to treatment and which require calcination to develop their pigment properties prior to use, it will be found essential to add the treating agent to such pigments subsequent to calcination.

As a result of use of the treating agent in accordance with this invention, it will be found that the resultant pigment materials will manifest superior properties over prior substances, particularly in respect to gloss and gloss retention characteristics when such pigments are incorporated in various types of coating composition, especially those of the enamel type. Thus, use of the instant invention affords production of pigment materials, particularly those containing calcium sulfate, which, when employed in oleaginous coating compositions, produce films exhibiting excellent gloss characteristics. Furthermore, when such compositions are applied to wood, metal, etc., the resultant films retain this desired property of high gloss and for a remarkably long period of time, even after prolonged exposure to the atmospheric elements. In addition, white oleaginous films in which white, inorganic pigment materials are present, and especially those extended with calcium sulfate, will be found to possess much better color than those heretofore obtainable and with corresponding types of pigments, but not containing the treating agents of the instant invention. Furthermore, pigments containing calcium sulfate, when treated in accordance with this invention, will exhibit markedly decreased water-sensitivity characteristics when employed in paints or similar coating compositions.

This application is a continuation-in-part of my co-pending application, Serial No. 265,931, filed April 4, 1939.

I claim as my invention:

1. A process for improving the gloss characteristics of a pigment-useful substance which comprises intimately associating with said substance a small amount of a quarternary ammonium base from the group consisting of trialkyl phenyl ammonium hydroxide and trialkyl phenyl alkylene ammonium hydroxide.

2. A process for improving the gloss characteristics of a pigment-useful substance which comprises intimately associating with said substance from about .05 to 2% of a quaternary ammonium base from the group consisting of trialkyl phenyl ammonium hydroxide and trialkyl phenyl alkylene ammonium hydroxide corresponding to the respective formulae of $$C_6H_5.N(X_3^1)OH \text{ and } C_6H_5X^2.N(X_3^1)OH$$

wherein $X^1$ consists of an alkyl substituent and $X^2$ consists of an alkylene substituent.

3. A process for improving the gloss characteristics of a pigment-useful substance which comprises intimately associating with said substance a small amount of a quarternary ammonium base from the group consisting of trialkyl phenyl ammonium hydroxide and trialkyl phenyl alkylene ammonium hydroxide, and wherein the alkyl and alkylene substituents contain less than 8 carbon atoms.

4. A process for improving the gloss characteristics of pigment-useful substances which comprises intimately associating with said pigment substances a small amount of trimethyl phenyl ammonium hydroxide.

5. A process for improving the gloss characteristics of pigment-useful substances which comprises intimately associating with said pigment substances a small amount of trimethyl benzyl ammonium hydroxide.

6. A process for improving the gloss characteristics of pigment-useful substances which comprises intimately associating with said pigment substances from about .05 to about 2% of trimethyl benzyl ammonium hydroxide.

7. A process for improving the gloss-imparting characteristics of pigment-useful substances which comprises intimately associating a small amount of trimethyl benzyl ammonium hydroxide, while in aqueous solution, with said pigment substance while the latter is in dry condition, and subsequently dry milling the resultantly treated pigment material.

8. A process for improving the gloss-imparting characteristics of pigment-useful substances which comprises intimately associating from .1 to 1% of trimethyl benzyl ammonium hydroxide, while in aqueous solution, with said pigment substance while the latter is in dry condition, and subsequently dry milling the resultantly treated pigment material.

9. A process for improving the gloss characteristics of pigment-useful substances which comprises intimately associating with said pigment substance from about .05 to about 2%, based on the weight of the pigment, of trimethyl benzyl ammonium hydroxide, subjecting the resultant mixture to pulverization and thereafter to disintegration.

10. As a new product, a pigment-useful substance having intimately associated therewith a small amount of a quarternary ammonium base from the group consisting of trialkyl phenyl ammonium hydroxide and trialkyl phenyl alkylene ammonium hydroxide.

11. As a new product, a pigment-useful material having intimately associated therewith from about .05 to about 2%, based on the weight of the pigment, of a quarternary ammonium compound from the group consisting of $$C_6H_5.N(X_3^1)OH \text{ and } C_6H_5X^2.N(X_3^1)OH$$

wherein $X^1$ consists of an alkyl substituent and $X^2$ of an alkylene substituent.

12. As a new product, a pigment-useful material having intimately associated therewith from about .05 to about 2%, based on the weight of the pigment, of a quarternary ammonium base from the group consisting of $$C_6H_5.N(X_3^1)OH \text{ and } C_6H_5X^2.N(X_3^1)OH$$

wherein $X^1$ consists of a monovalent alkyl substituent and $X^2$ consists of a divalent alkylene substituent having less than 8 carbon atoms.

13. As a new product, a pigment-useful substance having intimately associated therewith from about .1 to 1%, based on the weight of the pigment, of trimethyl benzyl ammonium hydroxide.

14. As a new product, a pigment-useful substance having intimately associated therewith from about .1 to 1%, based on the weight of the pigment, of trimethyl phenyl ammonium hydroxide.

15. As a new product, a calcined titanium oxide pigment having intimately associated therewith from about .05 to about 2%, based on the weight of the pigment, of trimethyl benzyl ammonium hydroxide.

16. As a new product, an anhydrite-extended titanium oxide pigment having intimately associated therewith from about .25 to about .75%, based on the weight of the pigment, of trimethyl benzyl ammonium hydroxide.

JOSEPH BARTLETT SUTTON.